US007945162B1

(12) United States Patent
Cortez et al.

(10) Patent No.: US 7,945,162 B1
(45) Date of Patent: May 17, 2011

(54) METHOD AND APPARATUS FOR ACCOMMODATING DIFFERENT SWITCH MATRIX GRANULARITIES IN OPTICAL NETWORKS

(75) Inventors: Bruce G. Cortez, Freehold, NJ (US); Frank Cariello, Red Bank, NJ (US); Mitchell H. Fuchs, Toms River, NJ (US); John Fraterrigo, Toms River, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 591 days.

(21) Appl. No.: 11/322,830

(22) Filed: Dec. 30, 2005

(51) Int. Cl.
*H04J 14/00* (2006.01)

(52) U.S. Cl. ........................................................ 398/52

(58) Field of Classification Search .................. None
See application file for complete search history.

(56) References Cited

U.S. PATENT DOCUMENTS 7,085,293 B2 * 8/2006 Raghavan et al. ............ 370/506
2004/0165540 A1 * 8/2004 Acharya et al. ............... 370/252

OTHER PUBLICATIONS

GRID Today, 'Daily News and Information for the Global Grid Community', Sep. 15, 2003, vol. 2, No. 37.*

* cited by examiner

*Primary Examiner* — Shi K Li

(57) ABSTRACT

A method is disclosed for replacing legacy interfaces of add drop ring optical networks using STS-3 granularity with an optical hub using STS-1 granularity. In order to avoid locking up ports on the optical hub with dedicated STS-3 packages, a signal broadcast feature of the optical hub, originally provided for remote provisioning, may be adapted to allow a single port to broadcast a signal on multiple and contiguous timeslots to the legacy networks expecting STS-3 granularity.

2 Claims, 3 Drawing Sheets

METHOD AND APPARATUS FOR ACCOMMODATING DIFFERENT SWITCH MATRIX GRANULARITIES IN OPTICAL NETWORKS

TECHNICAL FIELD

This disclosure generally relates to optical communications, and in particular it relates to optical switching.

BACKGROUND OF THE DISCLOSURE

Various metro and core optical networks utilize equipment supplied by many vendors that comprise varying degrees of technical advances. Often, technological evolution in optical networks has yielded smaller, more circuit-dense network equipment that requires less space and consumes less operating power. Telecommunications providers, and others employing optical networks, have an interest in reducing operational expenses and reclaiming office floor space by migrating to such newer systems. However, there are various circuit provisioning, equipment deployment and interoperability problems when introducing new equipment into legacy systems.

For example, various legacy versions of LUCENT TECHNOLOGIES' FT2000 Add Drop Ring (ADR) optical network utilize two different cross-connect fabric granularities on its high-speed interface OC48 (Optical Carrier 48) cards. Older versions of the FT2000 ADR (having one system per bay) use an STS-3 (Synchronous Transport Signal-3) granularity cross-connect fabric, while a more compact second generation FT2000 ADR system (having two systems per bay) uses the cross-connect rate of STS-1 granularity.

A problem lies with the older generation STS-3 granularity OC48 cards. The older version OC48 cards group circuits in packages of three STS-1s, and assign each STS-3 package to a low speed "drop" card. Low speed drop cards are configured as three DS3 (Digital Signal 3) connections per card, one OC3 per card, or one OC12 per card. In essence, an incoming OC48 signal is divided into sixteen STS-3 packages and terminated as STS-3 packages on the low speed drop cards. For example, a DS3 card will terminate an STS-3 package, an OC3 card terminates an STS-3 package, and an OC12 card terminates four STS-3 packages. Each timeslot within the STS-3 package corresponds to a specific drop port on the low speed drop card. Thus, ports on low speed drop cards become "locked" to a specific STS-3 package and are therefore "committed" to the far-end FT2000 equipment from which a specific STS-3 package originated. FIG. 1 illustrates the condition where three DS3 drop ports (ports 1-3) of a first FT2000 STS-1 granularity system (FT20000(1)) and a far end FT2000 STS-3 granularity system (FT2000(3)) are locked-up or dedicated to STS-3 packages transmitted therebetween. In this configuration, an intermediate FT2000 system (FT2000 (2)) is also locked out of using the timeslot (for example, slot 16) dedicated to the STS-3 package transmitted from FT2000 (1) to FT2000(3).

In addition, the most efficient use of the STS-3 granularity system is to assign contiguous drop ports whenever feasible. However, as circuits are added and subsequently dropped over time, the contiguous nature of the port assignments becomes lost. Thus, circuits are segmented across multiple STS-3 packages. To realign these manually is very expensive in terms of man hours, and any corrective actions will interrupt network operations while in progress.

Accordingly, there is a need for a method and apparatus for accommodating different switch matrix granularities in optical networks that addresses certain problems of existing technologies.

SUMMARY OF THE DISCLOSURE

The present disclosure, therefore, introduces a method for upgrading an optical network having components using STS-3 granularity. An optical hub, such as a DMX hub, is installed as an interface to an ADR having one or more components using STS-3 granularity, and may replace a legacy ADR interface. A signal broadcast feature of the DMX is enabled for a port of the optical hub, allowing the port to broadcast a signal on multiple and/or contiguous time slots to the component of the ADR using STS-3 granularity. In this manner, a granularity mismatch alarm on the component is avoided since the STS-1 signal from the port of the DMX is transmitted with STS-3 granularity. In addition, lock-up of multiple ports of the optical hub are avoided, since only one port is occupied. Intermediate network equipment (such as another DMX or ADR component) between the DMX and the far end STS-3 granularity equipment are additionally not locked out of particular ports or timeslots, thus avoiding the need to re-align port assignments.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 2:
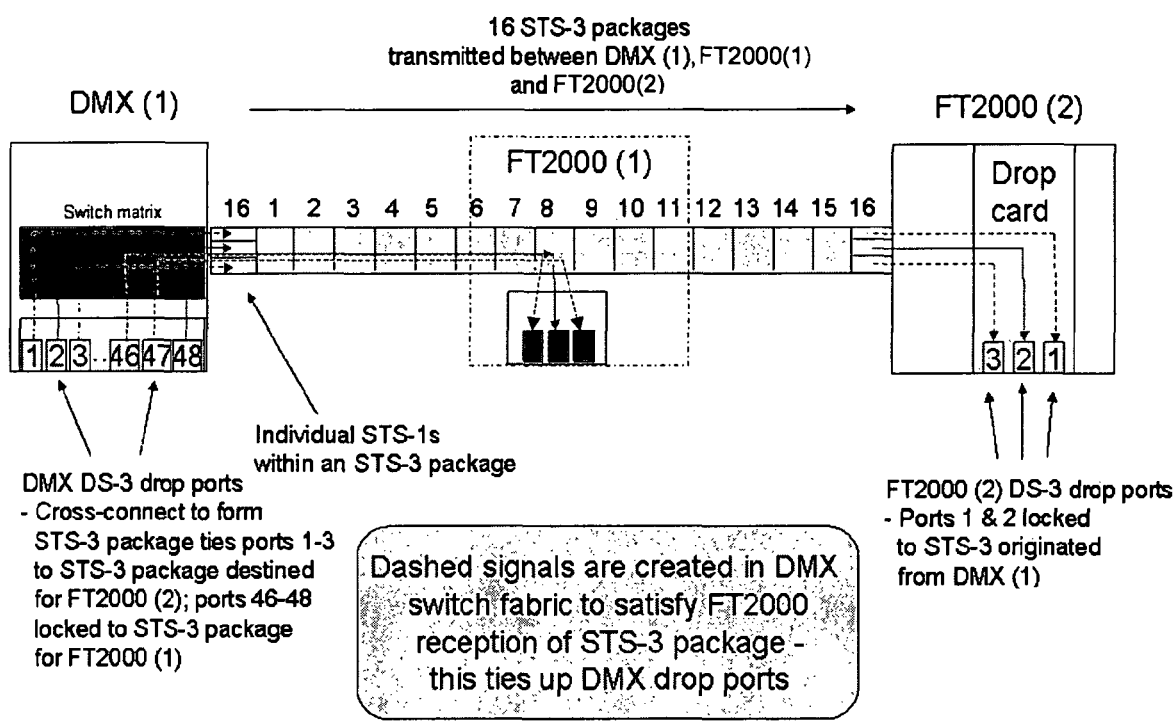
FIG. 2 is a block diagram illustrating data transmissions between an optical hub and legacy drop add terminals.
Figure 3:
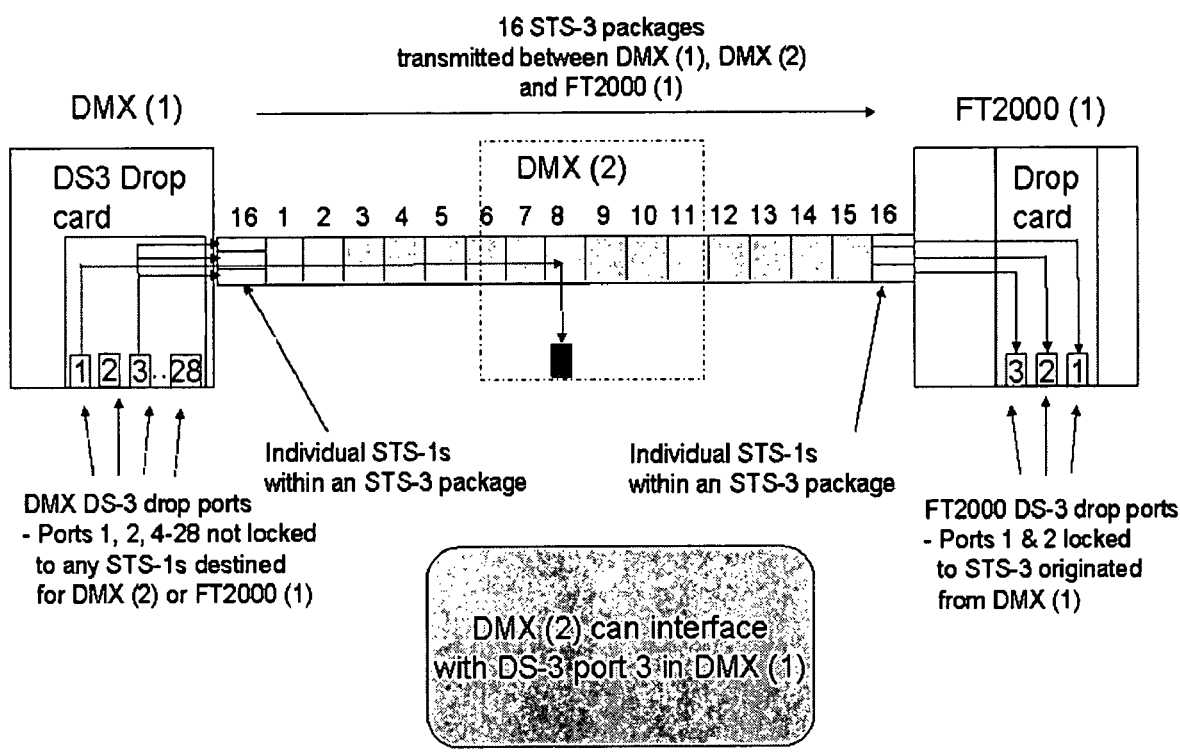
FIG. 3 is a block diagram illustrating a configuration of optical hubs and legacy add drop rings according to the present disclosure, in which ports need not be permanently tied up to accommodate legacy systems.

Referring now to FIGS. 2-3, various embodiments of a method and apparatus for accommodating different switch matrix granularities in optical networks will now be disclosed in more detail.

Newer generation optical network equipment utilize an STS-1 granularity cross connect fabric. Specifically, the Dataservices Multiplexer Xconnect (DMX) optical hub multi-services platform device, manufactured by LUCENT TECHNOLOGIES, was built off the earlier DDM-2000 platform, an STS-1 granularity cross-connect device that in some cases interfaces FT2000 equipment via an OC3 or OC12 STS-1 granularity interface. LUCENT is marketing the DMX as a solution for office space consolidation and improved power efficiency by replacing legacy FT2000 shelves with a single shelf DMX system. A telecommunications services company thus may replace one FT2000 system per ring with DMX equipment, thereby negating the need to replace all legacy equipment on a ring, while achieving some savings in floor space and operating expenses.

No interoperability issues are raised if second generation, (e.g., those using STS-1 granularity) FT2000 shelves are replaced with DMX shelves. However, when an FT2000 ring uses first generation FT2000 high speed circuit cards (e.g., STS-3 granularity), simply replacing FT2000 shelves with DMX shelves will not work. The STS-3 FT2000 equipment will transmit squelch table alarms because it expects circuits from the DMX to be in groups of STS-3, not STS-1.

Some apparent solutions to alleviate the alarm condition might include (1) re-aligning the circuits to improve the efficiency of the usage of drop ports with respect to STS-3 granularity; (2) adding additional drop port circuit cards to provide additional drop ports not allocated to specific equipment or (3) disabling the squelch alarm. However, these solutions are generally economically inefficient.

Figure 1:
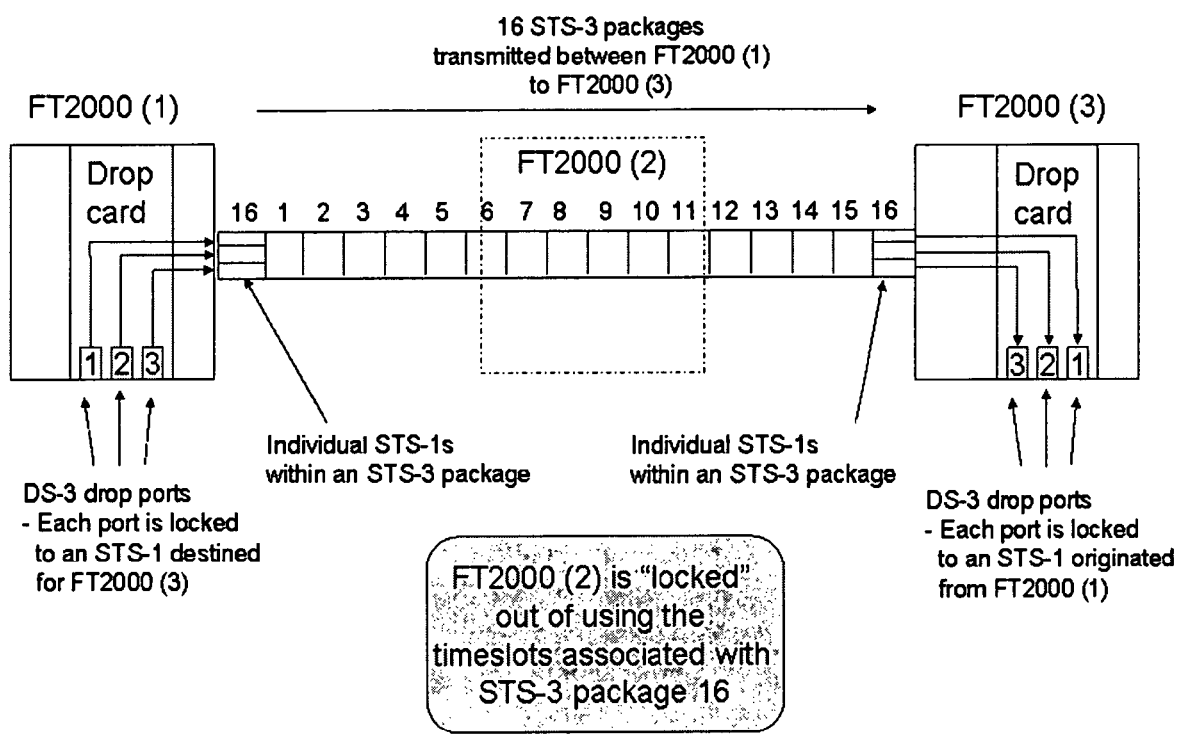
FIG. 1 is a diagram illustrating data transmissions between legacy add drop ring terminals of the prior art.

Another apparent solution would be to physically group the DMX circuits in STS-3 packages, as the legacy FT2000 counterparts on the ring expect. However, like the FT2000 case displayed in FIG. 1, this causes DMX drop ports to be locked-up or committed to a specific STS-3 package, as shown in FIG. 2. As represented therein, DMX(1) uses STS-1 granularity, and has an OC48 interface and drop cards with ports 1-48. DMX(1) transmits STS-3 packages on sixteen timeslots to FT2000(2) via FT2000(1). FT2000(2) uses STS-3 granularity. In this configuration, signals transmitted by DMX(1) must be cross-connected within its switch fabric (matrix) on three contiguous STS-1 ports (ports 1, 2 and 3), to emulate an STS-3 package that is expected by FT2000(2). Signals transmitted by DMX(1) must also be cross-connected within its switch fabric (matrix) on three contiguous STS-1 ports (ports 46, 47 and 48), to emulate an STS-3 package that is expected by FT2000(1). This locks various DMX drop ports to the specific STS-3 packages, making them unavailable for use to other network elements on the ring. This also locks up drop ports on the FT2000(1) and FT2000(2) systems.

A standard signal broadcast feature has previously been provided with the DMX hardware for the purposes of remote provisioning in optical networks. However, as now introduced herein, this feature can be adapted to resolve the lock-up problems by allowing a port to transmit a signal onto multiple timeslots simultaneously. Use of this feature allows a DMX drop port with STS-1 granularity the ability to broadcast it's transmit signal on multiple and contiguous timeslots to a far-end FT2000 expecting to receive an STS-3 granularity package.

This concept is illustrated in FIG. 3, wherein port 3 of DMX(1) avails itself of the signal broadcast feature of the DMX. Its signal is transmitted multiple times to form an STS-3 granularity signal that is expected by the far end FT2000(1) equipment. By using this feature, the DMX(1) is not required to lock up a drop port for each time slot used in the broadcast. Instead, only one port (for example, port 3) is dedicated, rather than three ports as in the previous configurations discussed above. In addition, an intermediate DMX (DMX(2)) is not locked out of interfacing with port 3 of DMX(1). Additionally, only two ports of the far end FT20000 system (ports 1 and 2, for example), are locked to the STS-3 package originating from DMX(1). The time slots used for the signal broadcast are also available for re-use by other network elements.

The existing signal broadcast feature of the DMX, as adapted for use herein, can resolve the granularity issues as described above, thereby avoiding operating and manpower expenses to overcome granularity size mismatches when replacing legacy equipment.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for upgrading an optical network having components using STS-3 granularity, the method comprising:

replacing an add drop ring legacy interface with an optical hub having STS-1 granularity and a signal broadcast feature provided for remote provisioning;

adapting the signal broadcast feature to allow a port of the optical hub to transmit a signal on multiple contiguous timeslots simultaneously, such that at least one timeslot used for the signal broadcast is also available for re-use; and broadcasting the signal from the port on multiple contiguous time slots simultaneously to a component of the optical network using STS-3 granularity for avoiding a granularity mismatch alarm on the component and lock-up of multiple ports of the optical hub.

2. The method of claim 1, wherein the optical hub comprises a Dataservices Multiplexer XConnect (DMX) optical hub.

* * * * *